Patented May 13, 1941

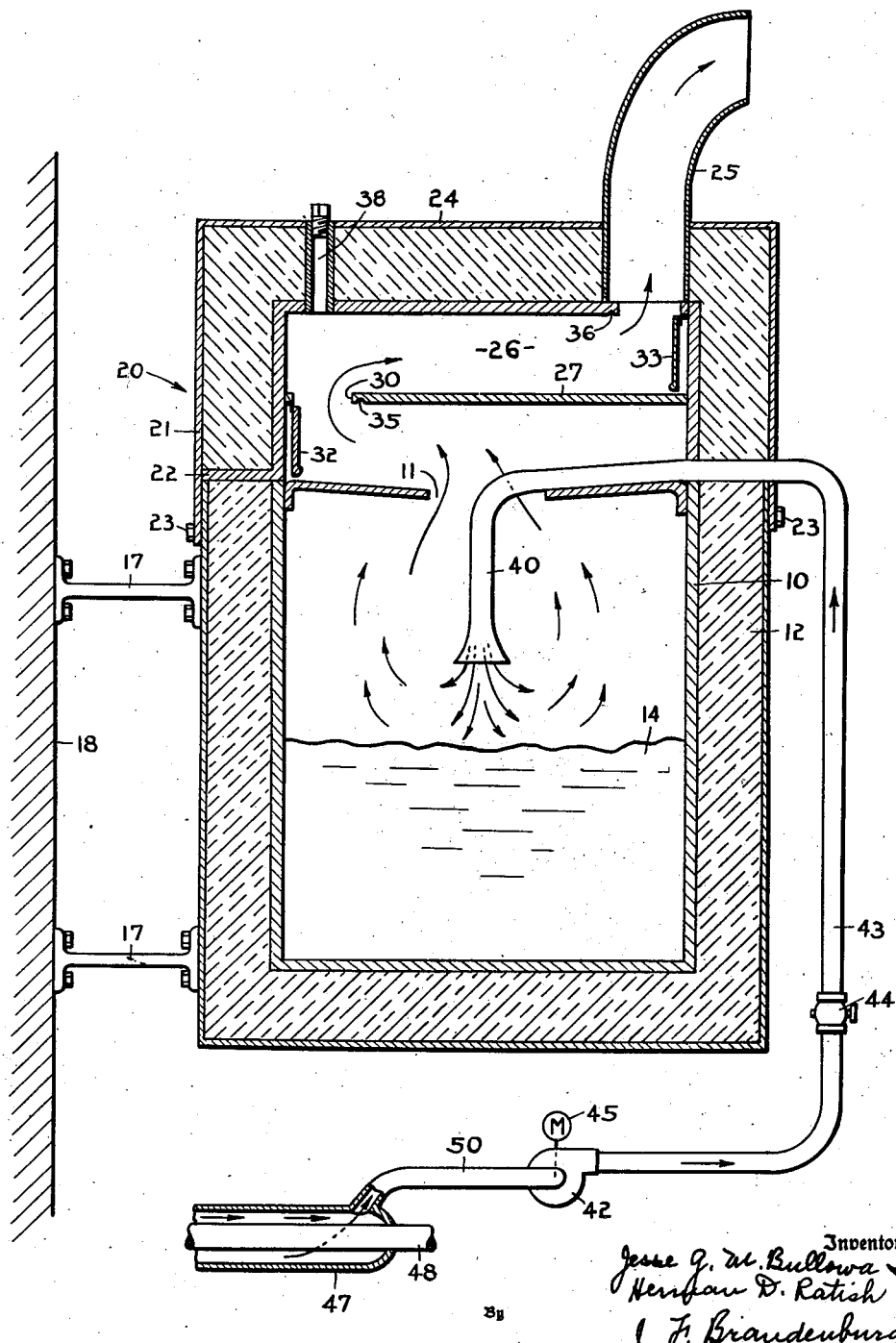

2,242,108

UNITED STATES PATENT OFFICE 2,242,108

OXYGEN VAPORIZER

Jesse G. M. Bullowa, New York, and Herman D. Ratish, Brooklyn, N. Y.

Application May 23, 1939, Serial No. 275,212

10 Claims. (Cl. 128—191)

This invention relates to devices for enriching air with oxygen vapor evolved from liquid oxygen. The invention relates more especially to an oxygen vaporizer and air enricher for airplane use.

It is an object of the invention to provide an improved oxygen vaporizer for liquid oxygen. One feature of the invention concerns a regulation of the rate of vaporization by a novel control of the contact of the circulating air with the surface of the liquid oxygen.

Another object of the invention is to provide apparatus for enriching the atmosphere of a cabin or other chamber with an evaporator that can be tipped at sharp angles or even overturned without spilling. These features are of importance when an airplane banks curves or turns upside-down momentarily when going through a loop.

Other objects, features and advantages of the invention will appear or be pointed out as the specification proceeds.

The drawing is a sectional view through a liquid oxygen vaporizer embodying this invention, with the heater and blower apparatus shown diagrammatically.

The vaporizer includes a vessel or container 10 which has an open mouth 11 at its upper end and a heat-insulating jacket 12 over its sides and bottom. The vessel 10 is of substantial horizontal cross-section so that when it is partially filled with liquid oxygen 14, the liquid oxygen has an extensive surface area.

The vessel 10 is shown supported by brackets 17 connected to a bulkhead 18 of an airplane. A trap chamber structure 20 is open at its lower end, and has an outer shell 21 that fits over the jacket 12 of the vessel 10 with a telescoping action that is limited by a flange 22 inside of the shell 21. The trap chamber structure is thus supported by the vessel 10, and the shell 21 fits snugly around the vessel 10 so that the connection is substantially leakproof when there is liquid oxygen in the trap chamber structure. Screws 23 hold the vessel 10 and structure 20 assembled.

There is a top 24 across the upper end of the shell 21 and a vapor discharge outlet 25 at the right side of the top 24. The shell 21 and top 24 form with the top of the vessel 10 a trap chamber 26 into which the liquid oxygen can spill when the vessel 10 is overturned. A partition 27 across the trap chamber has an opening 30 at the left side of the chamber and makes the passage through the chamber a horizontal reverse bend since vapor from the mouth 11 must first flow to the left and then to the right in order to reach the vapor discharge outlet 25.

A swing check or door 32 is hinged to the structure on the left side of the opening 30, and when closed prevents passage of fluid through the opening 30. A similar swing check or door 33 is hinged to the structure on the right side of the opening of the outlet 25 and closes to prevent escape of fluid through the vapor discharge outlet. The doors 32 and 33 are weighted to hang open when the vaporizer is right-side up and close when the vaporizer is upside down.

The weighting of the doors 32 and 33 puts the center of gravity of each door out of vertical alinement with the axis of its hinge and on the side nearer the opening 30 or 25 so that there is no dead-center position that could be approached by tilting sideways in which neither of the doors would swing closed. The edges of the doors 32 and 33 fit into sealing recesses 35 and 36, respectively, when the doors are closed.

The vaporizer is filled through an opening 38 in the top 24. This opening is closed by a screw plug, and liquid poured through the opening 38, when the plug is removed, strikes the top lip of the vessel 10 and drains through the mouth 11 into the vessel.

An air supply pipe 40 of substantially smaller diameter than the mouth 11 passes through the mouth and is preferably directed downward toward the center of the surface of the liquid oxygen. In the preferred embodiment of the invention, the pipe 40 terminates at a substantial distance above the bottom of the vessel 10 and above the level of the liquid oxygen.

Air is forced through the supply pipe 40 by a blower 42 which connects with the pipe 40 through a flexible hose 43. The rate of flow through the hose 43 and pipe 40 is controlled by a damper or valve 44 or by varying the blower speed. The blower is driven by an electric motor 45.

The air supplied to the evaporator will be considerably warmer than the liquid oxygen even though taken from the atmosphere without heating, but in the preferred embodiment of the invention a jacket 47 is placed around an exhaust pipe 48 of the airplane engine and the air for the blower 42 is drawn from the space between the exhaust pipe 48 and the jacket 47 where it is heated by the exhaust pipe. A pipe 50 connects the jacket 47 with the inlet of the blower.

The directions of movement of air and vapor currents throughout the system are indicated by arrows.

The operation of the vaporizer is as follows:

Warm air from within the jacket 47 is forced by the blower 42 through the hose 43 and into the air supply pipe 40. When the valve 44 is almost closed, the stream of warm air issuing from the discharge end of the pipe 40 has a low velocity and will turn back and rise by convection without ever penetrating the cold and heavy body of oxygen vapor overlying the surface of the liquid oxygen.

As the valve 44 is opened progressively wider, the flow of air increases and the stream of air issuing from the pipe 40 is of higher velocity and travels down nearer the surface of the liquid before turning back and rising by convection. Even before the air stream from pipe 40 becomes strong enough to actually impinge upon the surface of the liquid oxygen, it mixes with some of the oxygen vapor and causes some agitation of the liquid.

Agitation of the liquid oxygen by the air stream increases the evaporative surface of the liquid and further augments evaporation by generating some heat.

Wide opening of the valve 44 causes the air stream to issue from the pipe 40 at a high velocity that causes violent agitation of the liquid oxygen. Disturbance of the liquid surface is of course increased if the outlet of the pipe 40 is closer to the surface of the liquid, and reaches its maximum when the end of the pipe is actually submerged.

The doors 32 and 33, which with the partition 27 comprise checks to prevent the spilling of liquid oxygen when the airplane tips excessively or turns upside-down, are preferably at the forward and aft ends, respectively, of the apparatus when inserted in the airplane.

It will be apparent that this air-enriching apparatus is not limited to the particular embodiment which has been illustrated and described, and that features of the invention may be used without others.

We claim:

1. An air-enriching apparatus including a vessel for liquid oxygen, an air supply pipe opening into and directed downward in the vapor space above the liquid oxygen in said vessel, means for forcing a stream of air warmer than the liquid oxygen to blow from said supply pipe toward the surface of the liquid oxygen, and control apparatus adjustable to change said air stream to increase or decrease the evaporation from the surface of the oxygen.

2. Apparatus for enriching air with oxygen vapor, said apparatus comprising a liquid oxygen container with an opening in its upper portion for the escape of air and oxygen vapor, an air delivery pipe directed downward into the interior of the liquid oxygen container but terminating a substantial distance above the bottom of said container, an air heater, means for causing the heated air to move through the pipe and discharge into the vapor space above the liquid oxygen in a stream directed downward toward the surface of the liquid oxygen, and apparatus for regulating the velocity of the warm air stream to control the extent of its downward movement before it reverses and rises through said opening in the upper portion of the container.

3. An air-enricher for mixing air with oxygen vapor including in combination a container of substantial horizontal cross-section for holding liquid oxygen, an air conduit from which a stream of air is caused to impinge against the surface of the liquid oxygen, and control apparatus for regulating the air stream to cause said stream to agitate the liquid surface by varying amounts to influence the rate of evaporation.

4. An air-enriching device comprising a vessel with an open mouth, an air supply pipe directed downward into said vessel and passing substantially centrally through the mouth of the vessel and terminating in the vapor space in the upper portion of said vessel, and blower means for supplying air to the pipe including a regulator to control the force of the air stream that issues from the pipe downward toward the central region of the surface of liquid contained within said vessel.

5. A liquid oxygen vaporizer including a container in which the liquid oxygen is held, an air delivery pipe directed downward at a high angle toward a region substantially central of the surface of the liquid oxygen in the container, a blower that supplies air through the delivery pipe and against the surface of the liquid oxygen to agitate the liquid, and means controlling the force of the air stream from the delivery pipe and the resulting agitation of the surface of the liquid oxygen.

6. Apparatus for adding oxygen vapor to a volume of air including in combination a heat-insulated vessel of substantial horizontal cross-section in proportion to its height for holding a quantity of liquid oxygen with a surface exposed to the air above it, said vessel having an open mouth at its upper end for the escape of air and oxygen vapor, an air supply pipe smaller than the mouth of said vessel and extending through the mouth and substantially vertically downward in said vessel toward the center of the liquid surface, an air heater surrounding an exhaust pipe, a blower, conduit means including a flexible hose through which air from the heater is moved by the blower to said supply pipe from which the air stream issues, and a valve in said conduit means for controlling the rate of air flow.

7. A liquid oxygen vaporizer for an airplane including a container for the liquid oxygen, a conduit communicating with the upper part of the container for the escape of oxygen vapor from the container when the vaporizer is in use, and checks in said conduit which prevent the escape of liquid through said conduit when the vaporizer is tipped or overturned in any direction.

8. A liquid oxygen vaporizer for an airplane including a container for the liquid oxygen, an outlet conduit through which oxygen vapor passes out of said container when the vaporizer is in use, said outlet including a reverse bend passage extending forward and aft of the airplane, and one or more check-valves in said outlet in position to prevent the escape of liquid oxygen when the vaporizer is upside-down.

9. In a liquid oxygen vaporizer for an airplane, a vessel in which the liquid oxygen is held and vapor is evolved, a vapor discharge outlet, a trap chamber through which the vapor passes on its way from the vessel to the vapor discharge outlet, and a plurality of traps in the chamber hinged on different sides for closing the chamber against the passage of liquid when the vaporizer is turned upside down from any direction.

10. A liquid oxygen vaporizer including a vessel open at the top for the escape of vapor, a trap chamber structure having an open lower end that fits over the upper end of the vessel in a telescoping relation, a vapor outlet at one end of the top of the trap chamber structure, a baffle in said structure making the vapor passage through the trap chamber structure a reverse bend, and traps hinged within said structure on opposite sides in positions to close the passage through the trap chamber structure when the vaporizer is turned upside-down.

JESSE G. M. BULLOWA.
HERMAN D. RATISH.